United States Patent
Tanaya (10) Patent No.: US 9,512,792 B2
(45) Date of Patent: Dec. 6, 2016

(54) INTERNAL COMBUSTION ENGINE CONTROL APPARATUS

(71) Applicant: MITSUBISHI ELECTRIC CORPORATION, Chiyoda-ku, Tokyo (JP)

(72) Inventor: Kimihiko Tanaya, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 126 days.

(21) Appl. No.: 14/496,713

(22) Filed: Sep. 25, 2014

(65) Prior Publication Data

US 2015/0322900 A1    Nov. 12, 2015

(30) Foreign Application Priority Data

May 8, 2014  (JP) ................... 2014-096633

(51) Int. Cl.
   *F02M 25/07*      (2006.01)
   *F02D 41/00*      (2006.01)
   (Continued)

(52) U.S. Cl.
   CPC .......... *F02D 41/0052* (2013.01); *F02D 37/02* (2013.01); *F02M 25/0702* (2013.01);
   (Continued)

(58) Field of Classification Search
   CPC .. F02D 41/0052; F02D 37/02; F02M 25/0702; F02M 25/0772; F02M 2026/001; F02P 17/12
   (Continued)

(56) References Cited

U.S. PATENT DOCUMENTS 5,584,275 A    12/1996  Taruya
5,639,961 A *  6/1997   Lautenschutz ........ F02D 35/027
                                                    123/406.48

(Continued)

FOREIGN PATENT DOCUMENTS

JP       08270537 A      10/1996
JP    2001323866 A      11/2001
(Continued)

OTHER PUBLICATIONS

Communication dated Sep. 15, 2015 from the Japanese Patent Office issued in corresponding Japanese application No. 2014-096633.

*Primary Examiner* — Hieu T Vo
*Assistant Examiner* — Arnold Castro
(74) *Attorney, Agent, or Firm* — Sughrue Mion, PLLC; Richard C Turner (57) ABSTRACT

An internal combustion engine control apparatus is provided that can prevent the operation of an internal combustion engine from becoming unstable even when the ignition apparatus fails, that can prevent the components of the exhaust gas from being deteriorated, and that can suppress the exhaust amount of environmental load substances from increasing. A diagnosis unit is provided that determines whether or not an energy supply unit is normally supplying energy to a conductive path formed in the gap of an ignition plug; a control unit controls an EGR unit in accordance with the result of a diagnosis by the diagnosis unit so as to control the amount of burned gas to be recirculated to the internal combustion engine.

11 Claims, 7 Drawing Sheets

(51) Int. Cl.
*F02P 17/12* (2006.01)
*F02D 37/02* (2006.01)
*F02P 3/04* (2006.01)
*F02P 9/00* (2006.01)
*F02P 15/10* (2006.01)

(52) U.S. Cl.
CPC ......... *F02M 25/0772* (2013.01); *F02P 17/12* (2013.01); *F02M 2026/001* (2016.02); *F02P 3/0407* (2013.01); *F02P 9/007* (2013.01); *F02P 15/10* (2013.01); *Y02T 10/47* (2013.01)

(58) Field of Classification Search
USPC .......................... 123/568.21, 561.23, 568.24, 568.25, 123/568.26
See application file for complete search history.

(56) References Cited

U.S. PATENT DOCUMENTS

| | | | |
|---|---|---|---|
| 6,076,502 A * | 6/2000 | Katashiba | F02D 21/08 123/435 |
| 2004/0084017 A1 | 5/2004 | Viele et al. | |
| 2004/0088102 A1 * | 5/2004 | Daniels | F01N 3/2006 701/108 |
| 2004/0187847 A1 | 9/2004 | Viele et al. | |
| 2007/0186903 A1 * | 8/2007 | Zhu | F01N 3/2006 123/406.37 |
| 2009/0183719 A1 * | 7/2009 | Aida | F02P 17/12 123/644 |
| 2010/0147544 A1 | 6/2010 | Yoshizaki et al. | |
| 2010/0258081 A1 * | 10/2010 | Tanaya | F02P 5/1502 123/406.58 |
| 2011/0114071 A1 * | 5/2011 | Freen | F02P 23/04 123/623 |
| 2013/0234608 A1 | 9/2013 | Nakayama et al. | |
| 2014/0336956 A1 * | 11/2014 | Patti | F02D 41/22 702/50 |

FOREIGN PATENT DOCUMENTS

| | | |
|---|---|---|
| JP | 2005315256 A | 11/2005 |
| JP | 2007332895 A | 12/2007 |
| JP | 2010151125 A | 7/2010 |
| JP | 2011-99410 A | 5/2011 |
| JP | 2013185473 A | 9/2013 |
| JP | 2013232383 A | 11/2013 |
| WO | 2014016971 A1 | 1/2014 |

* cited by examiner

INTERNAL COMBUSTION ENGINE CONTROL APPARATUS

BACKGROUND OF THE INVENTION

Field of the Invention

The present invention relates to an internal combustion engine control apparatus mounted in a vehicle such as an automobile.

Description of the Related Art

In recent years, the issues such as environment preservation and fuel depletion have been raised; measures for these issues are urgently required also in the automobile industry. As an example for the measures, there exists a technology that reduces pumping loss in an internal combustion engine by use of Exhaust Gas Recirculation (referred to as "EGR", hereinafter) so as to drastically improve the fuel consumption amount.

However, burned gas, which is exhaust air of the internal combustion engine, is noninflammable and the heat capacity thereof is larger than that of air; therefore, there has been a problem that when the internal engine takes in the burned gas again through EGR, the ignitability and the flammability of the fuel are deteriorated.

To date, as one of solutions for this problem, there has been proposed an internal combustion engine control apparatus that makes an ignition apparatus produce a high-energy spark discharge. This apparatus makes it possible to stabilize the ignitability of fuel and to form a more stabilized flame kernel; thus, the flammability can further be stabilized.

As an ignition apparatus that is utilized in such a conventional internal combustion engine control apparatus and produces a high-energy spark discharge, there has been disclosed an ignition apparatus that is provided with an electric field generation circuit, which is electricity connected with an ignition plug and generates an electric field in the combustion chamber, and that produces plasma by making a spark discharge, at the ignition plug, produced by a high voltage react with the generated electric field so as to ignite a fuel-air mixture (e.g., refer to Patent Document 1).

The usage of the conventional ignition apparatus disclosed in Patent Document 1 makes it possible to produce a stronger, high-energy spark discharge in the gap of an ignition plug than an ignition apparatus provided with an ordinary ignition coil, to provide a flame kernel with more energy, and to form a more stabilized flame kernel. Accordingly, for example, even when through foregoing EGR, a great deal of burned gas is provided to an internal combustion engine, stabilized combustion can be achieved; therefore, a pumping loss can be reduced by more actively utilizing EGR and hence there can be obtained an internal combustion engine that can drastically decrease the fuel consumption amount.

PRIOR ART REFERENCE

Patent Document

[Patent Document 1] Japanese Patent Application Laid-Open No. 2011-099410

In an internal combustion engine control apparatus in which the ignition apparatus disclosed in Patent Document 1 is utilized and a great deal of burned gas is provided thereto by more actively utilizing EGR, there is posed a problem that when the ignition apparatus disclosed in Patent Document 1 fails, stable ignition and combustion cannot be achieved, the operation of the internal combustion engine becomes unstable, the components of the exhaust gas is deteriorated, and then the exhaust amount of environmental load substances increases.

SUMMARY OF THE INVENTION

The present invention has been implemented in order to solve the foregoing problems in a conventional internal combustion engine control apparatus; the objective thereof is to provide an internal combustion engine control apparatus that can prevent the operation of an internal combustion engine from becoming unstable even when the ignition apparatus fails, that can prevent the components of the exhaust gas from being deteriorated, and that can suppress the exhaust amount of environmental load substances from increasing.

An internal combustion engine control apparatus according to the present invention includes an ignition plug that is provided with a first electrode and a second electrode facing each other through a gap and produces a spark discharge in the gap so that an inflammable fuel-air mixture inside a combustion chamber of an internal combustion engine is ignited, a conductive path creation unit that generates a high voltage and supplies the generated high voltage to the first electrode so as to produce the spark discharge in the gap and to form a conductive path in the gap, an energy supply unit that supplies energy to the conductive path based on the spark discharge formed in the gap, a diagnosis unit that determines whether or not the energy supply unit is normally supplying the energy to the gap of the ignition plug, an EGR unit that recirculates at least part of burned gas of the internal combustion engine to the combustion chamber, and a control unit that controls the internal combustion engine, the energy supply unit, and the EGR unit; the internal combustion engine control apparatus is characterized in that in accordance with the result of a diagnosis by the diagnosis unit, the control unit controls the EGR unit so that the amount of the burned gas to be recirculated is controlled.

An internal combustion engine control apparatus according to the present invention makes it possible to prevent the operation of an internal combustion engine from becoming unstable even when the ignition apparatus including the ignition plug fails and to prevent the exhaust amount of environmental load substances from increasing.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

An internal combustion engine control apparatus according to Embodiment 1 of the present invention opens an EGR valve and reduces the pumping loss so as to raise the operation efficiency of the engine, and concurrently prevents, through high-energy ignition, deterioration of the ignitability and the flammability, caused by a great deal of burned gas entering the combustion chamber. The following explanation will be made with an automobile engine as an example of internal combustion engine.

Figure 1:
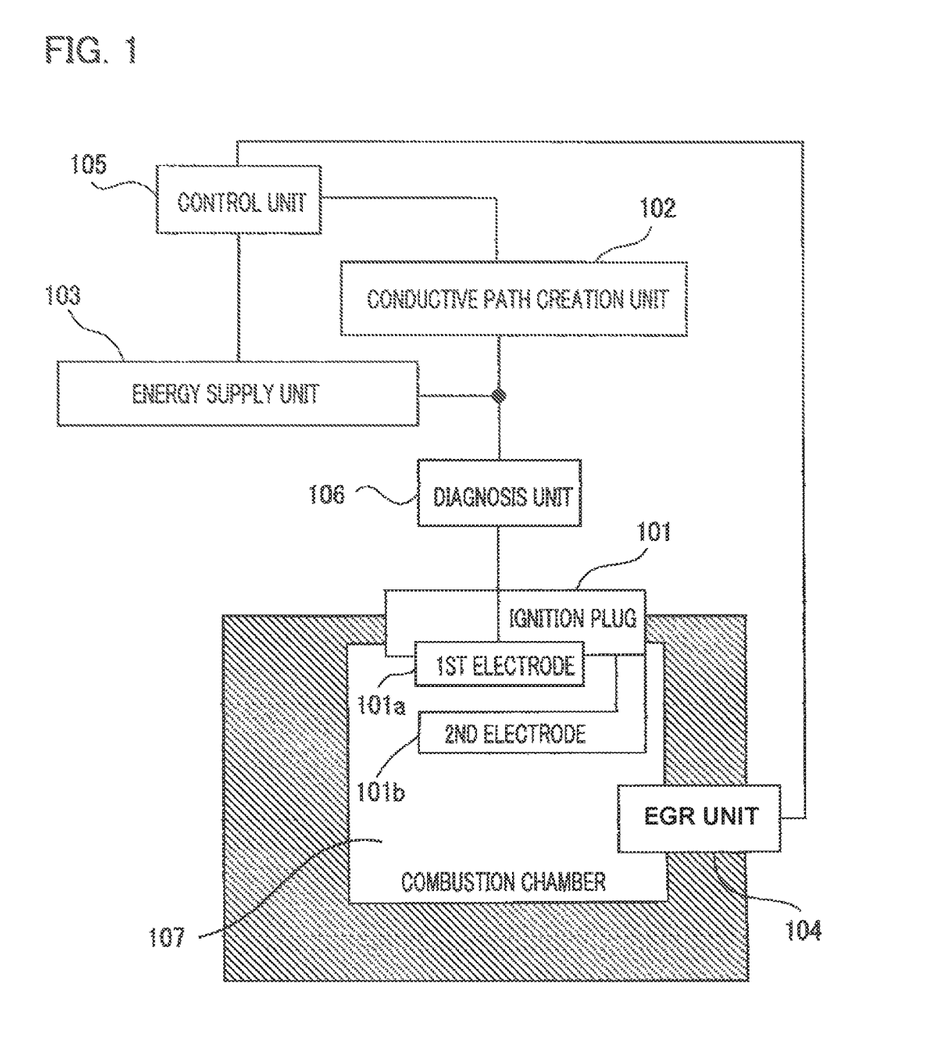
FIG. 1 is a configuration diagram conceptually illustrating the configuration of an internal combustion engine control apparatus according to Embodiment 1 of the present invention.

FIG. 1 is a configuration diagram conceptually illustrating the configuration of an internal combustion engine control apparatus according to Embodiment 1 of the present invention. In FIG. 1, the internal combustion engine control apparatus according to Embodiment 1 of the present invention is configured with an ignition plug 101 that is provided with a first electrode 101a, as a central electrode, and a second electrode 101b, as a GND electrode of the ground potential, which face each other through a gap, and that produces a spark discharge in the gap so that an inflammable fuel-air mixture inside a combustion chamber of an internal combustion engine is ignited; an ignition coil 102 as a conductive path creation unit that generates a high voltage and supplies the generated high voltage to the first electrode 101a so as to produce a spark discharge in the gap and to form a conductive path in the gap; an energy supply unit 103 that supplies energy to the conductive path based on a spark discharge formed in the gap between the first electrode 101a and the second electrode 101b of the ignition plug 101; a diagnosis unit 106 that diagnoses whether or not the energy supply unit 103 supplies energy to the gap between the first electrode 101a and the second electrode 101b of the ignition plug 101; an EGR unit 104 that controls the EGR amount of the internal combustion engine (unillustrated); and a control unit 105, as an engine control unit (referred to as an ECU, hereinafter), that controls the operation of the energy supply unit 103, the operation of the EGR unit 104, and the operation of the internal combustion engine. The diagnosis unit 106 is formed mainly of an after-mentioned diagnosis processing unit 408 provided in the control unit 105.

Figure 2:
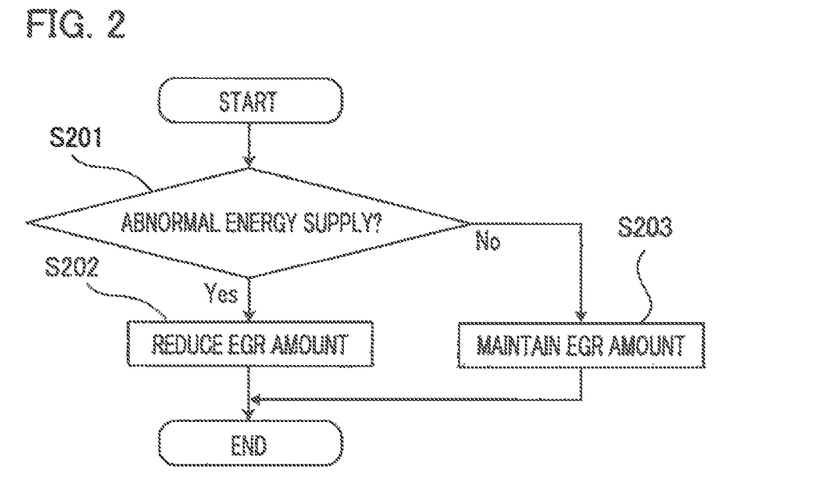
FIG. 2 is a flowchart representing the operation of the internal combustion engine control apparatus according to Embodiment 1 of the present invention.

The control unit 105 controls the EGR unit 104 in accordance with the result of a diagnosis by the diagnosis unit 106 so as to control the EGR supply amount. FIG. 2 is a flowchart representing the operation of the internal combustion engine control apparatus according to Embodiment 1 of the present invention. For example, in the case where as represented in the flowchart in FIG. 2, the diagnosis unit 106 determines in the step S201 that the energy supply unit 103 does not normally supply energy (Yes), the step S201 is followed by the step S202, where the control unit 105 controls the EGR unit 104 so as to reduce the EGR amount to be supplied to the inside of a combustion chamber 107.

In contrast, in the case where the diagnosis unit 106 determines in the step S201 that the energy supply unit 103 normally supplies energy (No), the step S201 is followed by the step S203, where the control unit 105 controls the EGR unit 104 so as to maintain the EGR amount to be supplied to the inside of a combustion chamber 107.

Figure 3:
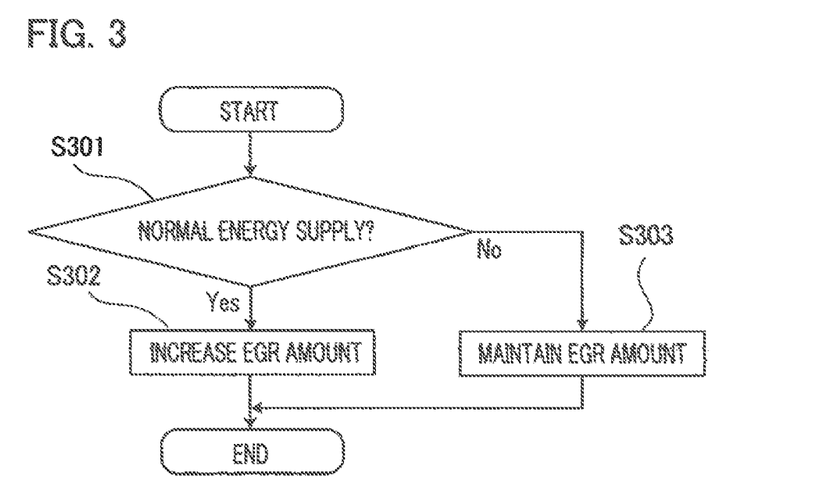
FIG. 3 is a flowchart representing another operation of the internal combustion engine control apparatus according to Embodiment 1 of the present invention.

FIG. 3 is a flowchart representing another operation of the internal combustion engine control apparatus according to Embodiment 1 of the present invention. Unlike the operation represented by the flowchart in FIG. 2, in the case where as represented in the flowchart in FIG. 3, the diagnosis unit 106 determines in the step S301 that the energy supply unit 103 normally supplies energy (Yes), the step S301 is followed by the step S302, where the control unit 105 controls the EGR unit 104 so as to increase the EGR amount to be supplied to the inside of a combustion chamber 107.

In contrast, in the case where the diagnosis unit 106 determines in the step 3201 that the energy supply unit 103 does not normally supply energy (No), the step S301 is followed by the step S303, where the control unit 105 controls the EGR unit 104 so as to maintain the EGR amount to be supplied to the inside of a combustion chamber 107.

Figure 4:
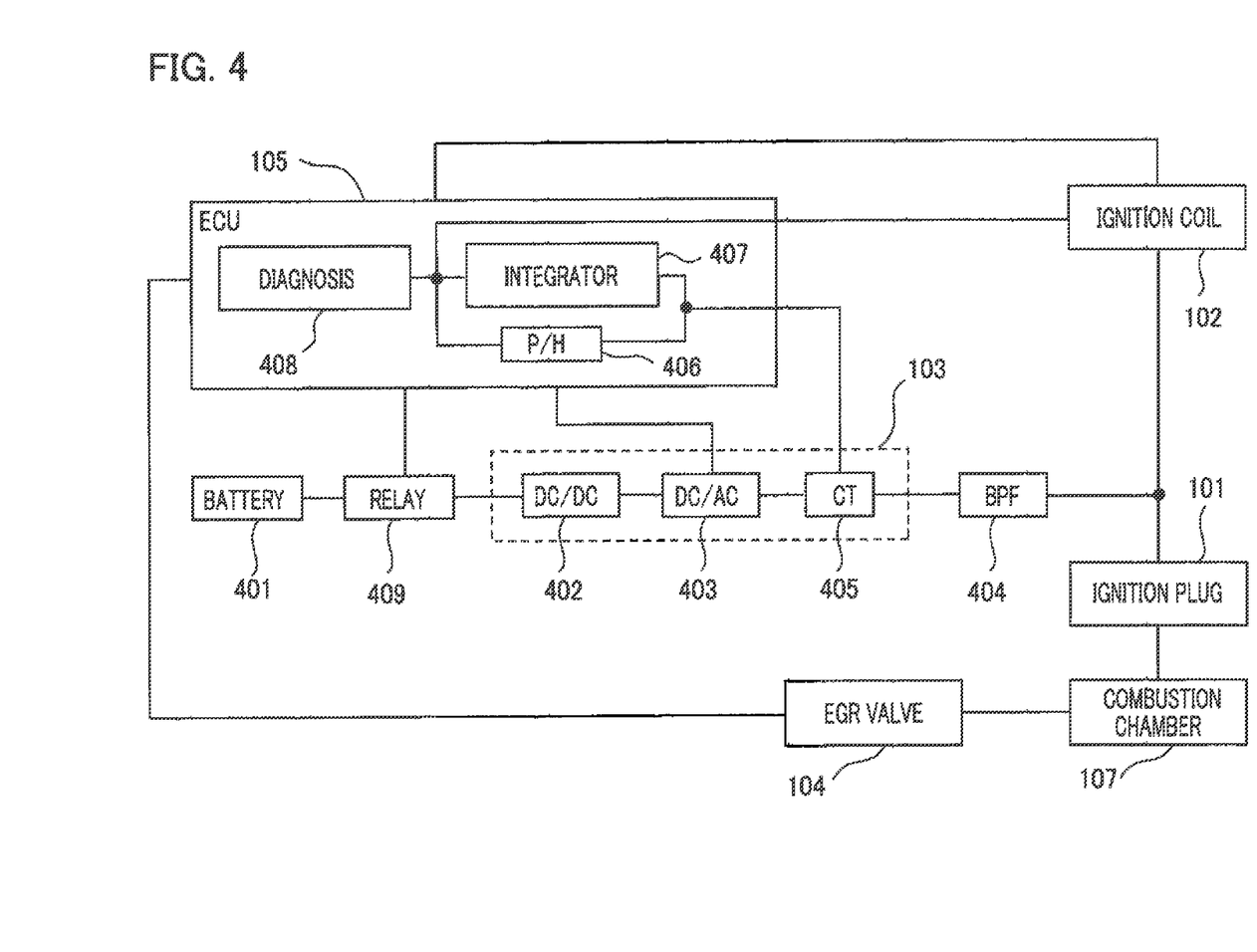
FIG. 4 is a block diagram specifically illustrating the configuration of the internal combustion engine control apparatus according to Embodiment 1 of the present invention.

FIG. 4 is a block diagram specifically illustrating the configuration of the internal combustion engine control apparatus according to Embodiment 1 of the present invention; the same reference numerals as those in FIG. 1 denote the same elements. In FIG. 1, the element indicated by Reference Numeral 102 is described as "a conductive path creation unit"; however, in FIG. 4, this element is described as "an ignition coil", which is a specific form of the conductive path creation unit. In FIG. 1, the element indicated by Reference Numeral 104 is described as "an EGR unit"; however, in FIG. 4, this element is described as "an EGR valve", which is a specific form of the EGR unit.

In FIG. 4, as described above, the control unit 105 is provided in the ECU and incorporates the diagnosis processing unit 408 included in the diagnosis unit 106, an integrator 407, and a peak hold detector 406. The diagnosis processing unit 408 is formed of a microcomputer in the ECU.

The energy supply unit 103 includes a DC/DC converter 402 that converts DC power from the battery 401 mounted in the vehicle into desired DC power, a DC/AC converter 403 that converts DC power from the DC/DC converter 402 into AC power, and a current transformer 405 connected with the output of the DC/AC converter 403. A relay 409 is a specific form for implementing shutdown processing such as stopping electric power supply to the energy supply unit 103 for safety's sake; the operation thereof will be described later. The band-pass filter BPF 404 supplies the first electrode 101a of the ignition plug 101 with predetermined-frequency AC energy out of AC energy of the energy supply unit 103.

Next, there will be explained the operation of the internal combustion engine control apparatus, according to Embodiment 1 of the present invention, that is configured as described above. In general, in the driving state where as in the low-speed traveling mode of a vehicle, the driver is not stepping on the accelerator, i.e., in the case where the opening degree of the throttle valve is small, the pumping loss at a time when air is taken in becomes large and hence the operational efficiency of the internal combustion engine is lowered; as a result, the consumption amount of the fuel increases. In contrast, in the internal combustion engine control apparatus according to Embodiment 1 of the present invention, for the purpose of reducing the pumping loss of the internal combustion engine so as to suppress unnecessary consumption of the fuel, the control unit 105 issues an instruction of opening the EGR valve 104. When the EGR valve 104 is opened, not only air taken in through the throttle but also burned gas obtained through the EGR valve 104 can enter the combustion chamber 107 of the internal combustion engine through the air inlet; thus, the pumping loss can be reduced.

However, when the proportion of burned gas in the combustion chamber 107 becomes large, the ignitability of the fuel and the flammability after ignition are deteriorated; therefore, in order to prevent the deterioration in the ignitability and the flammability, the control unit 105 makes the ignition coil 102 and the energy supply unit 103 operate in the following manner so as to reinforce spark discharge.

In other words, in each of FIGS. 1 and 4, the energy supply unit 103 firstly receives the DC voltage, for example, 14[V] of the battery 401 and then the DC/DC converter 402 boosts the DC voltage to a DC voltage of, for example, 100[V] Next, in response to the instruction from the control unit 105, the energy supply unit 103 converts the electric energy of the DC voltage, which has been boosted from 14[V] to 100[V], into AC electric energy and then supplies the converted AC electric energy to the ignition plug 101, by way of the current transformer 405 and the band-pass filter 404.

However, normally, the AC electric energy alone, generated by the energy supply unit 103, cannot produce a spark discharge in the gap between the first electrode 101a and the second electrode 101b. In other words, under the condition that no spark discharge has been produced in the foregoing gap, the AC electric energy alone, generated by the energy supply unit 103, cannot produce a spark discharge in the gap between the first electrode 101a and the second electrode 101b.

The current transformer 405 detects the current components out of the AC electric energy supplied from the energy supply unit 103. The current signal detected by the current transformer 405 is received by the control unit 105, by way of the peak hold detector 406 and the integrator 407. Based on the current signal received by the control unit 105, the diagnosis unit 106 diagnoses whether or not the energy supply unit 103 normally outputs AC electric energy. The processing based on the diagnostic operation and the diagnostic result will be described later.

The ignition coil 102, which has received the instruction from the control unit 105 at a timing the same as that of the foregoing operation, generates electric energy for producing a spark discharge in the gap between the first electrode 101a and the second electrode 101b of the ignition plug 101 and then supplies the electric energy to the first electrode 101a of the ignition plug 101.

When due to the electric energy from the ignition coil 102, a spark discharge is produced in the gap between the first electrode 101a and the second electrode 101b of the ignition plug 101, the impedance in the gap between the first electrode 101a and the second electrode 101b of the ignition plug 101 is lowered; thus, the AC electric energy generated by the energy supply unit 103 is supplied to the spark discharge path formed in the gap between the first electrode 101a and the second electrode 101b of the ignition plug 101. Therefore, because the AC electric energy generated by the energy supply unit 103 is added to the spark discharge produced, due to the electric energy of the ignition coil 102, in the foregoing gap, the spark discharge can be reinforced.

When the spark discharge is reinforced through the addition of the AC electric energy generated by the energy supply unit 103, it is made possible to prevent the flammability from decreasing and to form a stable flame kernel; thus, the flammability after ignition can be suppressed from decreasing. Accordingly, the pumping loss can be reduced and hence unnecessary consumption of the fuel can be suppressed.

As described above, in order to obtain the stable ignitability and flammability under the condition that the proportion of burned gas in the combustion chamber 107 of the internal combustion engine is large, i.e., under the condition that the EGR valve 104 is opened so as to reduce the pumping loss, it is required to reinforce a spark discharge; however, provided that such reinforcement of a spark discharge is not achieved, the foregoing decrease in the flammability is caused, the operation of the internal combustion engine becomes unstable, non-combusted gas is exhausted, and hence the stoppage of the internal combustion engine is caused.

In order to prevent these troubles, the control unit 105 diagnoses whether or not the spark discharge is reinforced, by use of the current signal received through the current transformer 405, and takes appropriate measures, described below.

Figure 5A:
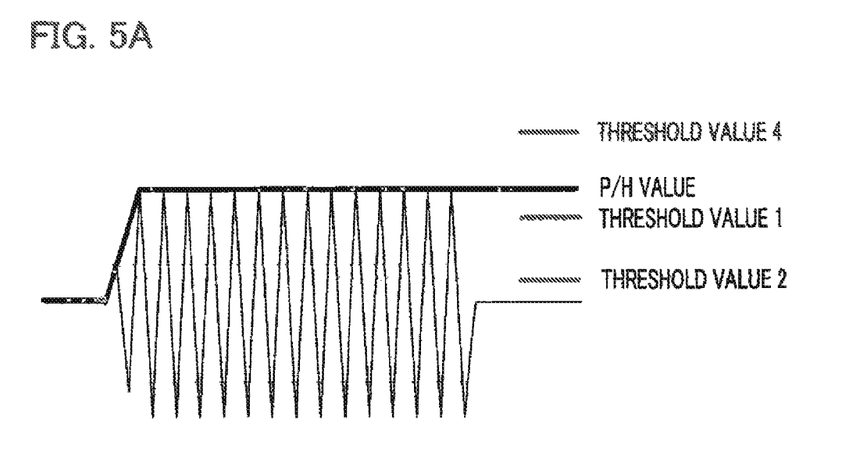
FIG. 5A is an explanatory chart representing the waveform of a spark discharge reinforcement current and the peak hold value thereof in the internal combustion engine control apparatus according to Embodiment 1 of the present invention.
Figure 5B:
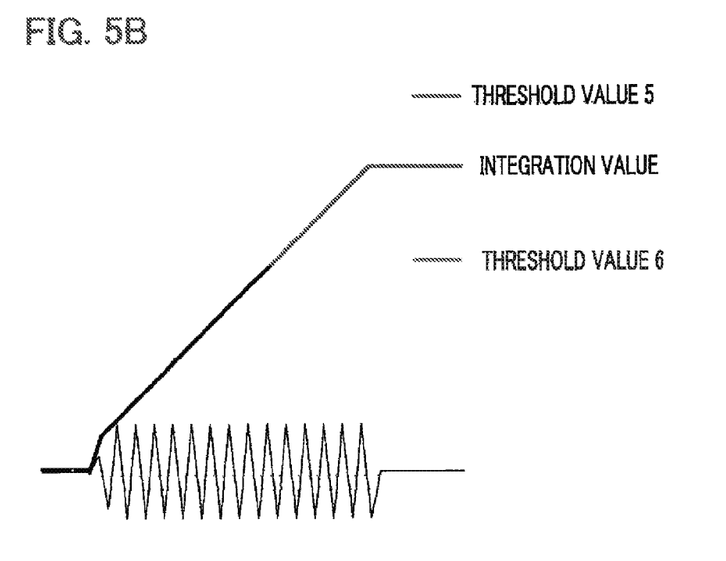
FIG. 5B is an explanatory chart representing the waveform of a spark discharge reinforcement current and the integration value thereof in the internal combustion engine control apparatus according to Embodiment 1 of the present invention.
Figure 6A:
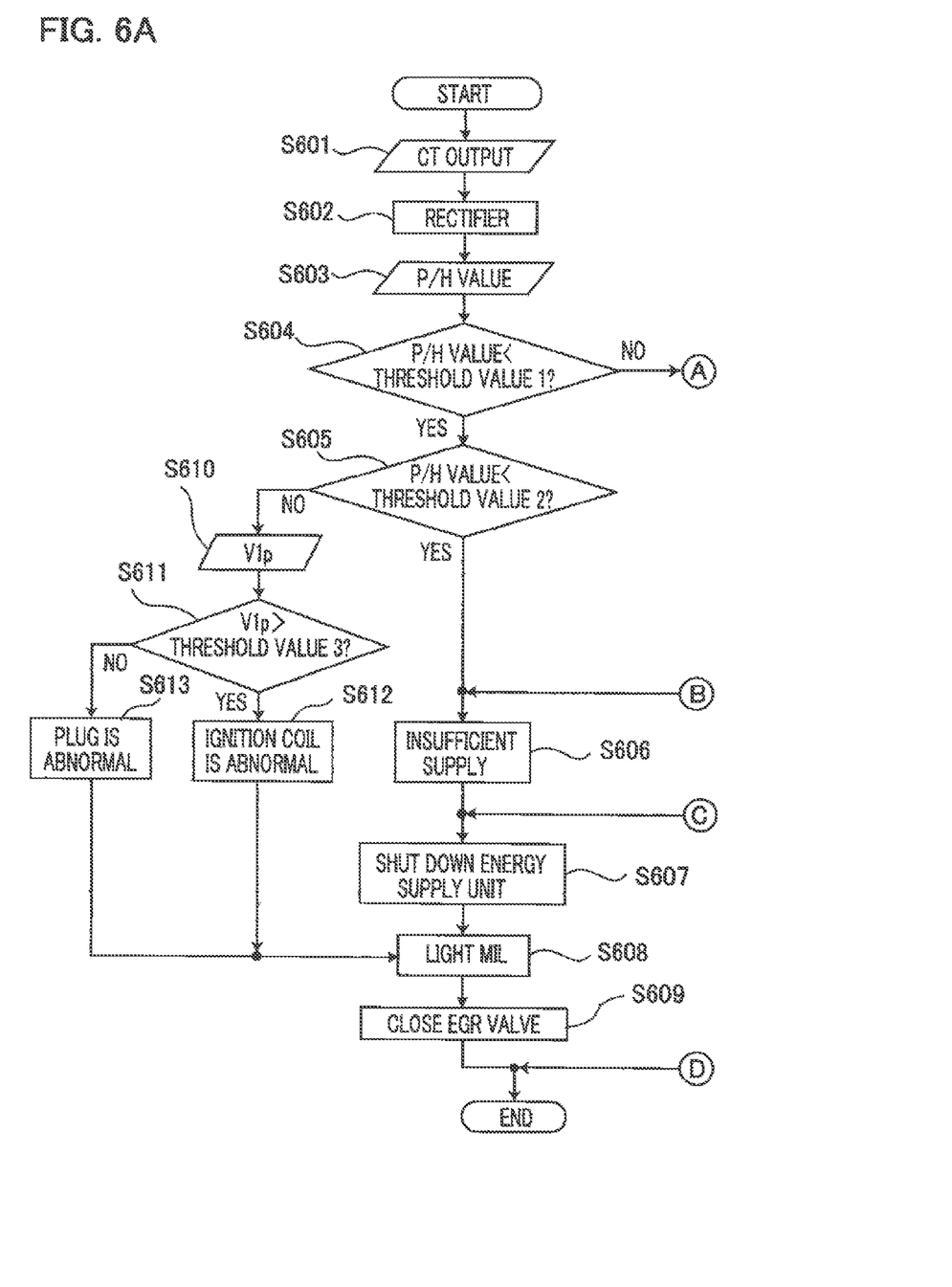
FIGS. 6A and 6B are a set of flowcharts representing the operation of a diagnosis unit in the internal combustion engine control apparatus according to Embodiment 1 of the present invention.
Figure 6B:
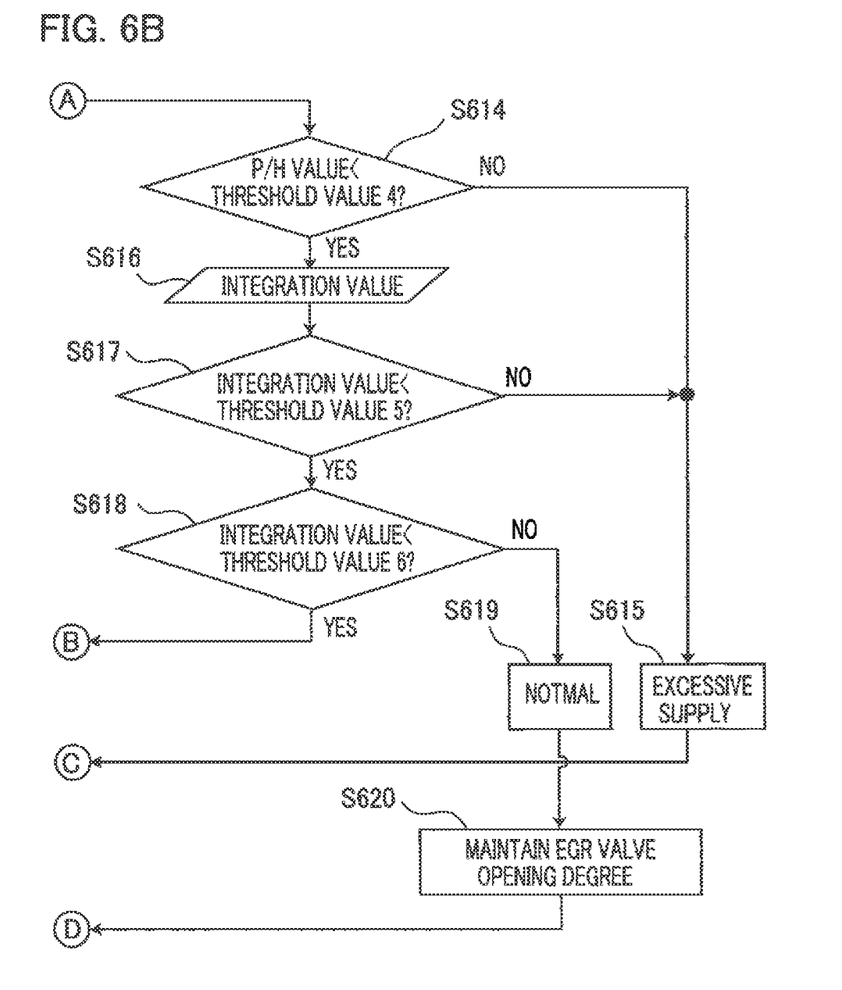

FIG. 5A is an explanatory chart representing the waveform of a spark discharge reinforcement current and the peak hold value (referred to as a P/H value, hereinafter) thereof in the internal combustion engine control apparatus according to Embodiment 1 of the present invention; FIG. 5B is an explanatory chart representing the waveform I of the spark discharge reinforcement current and the integration value thereof. FIGS. 6A and 6B are a set of flowcharts representing the operation of the diagnosis unit in the internal combustion engine control apparatus according to Embodiment 1 of the present invention. Hereinafter, with reference to the explanatory charts in FIGS. 5A and 5B and the flowcharts in FIGS. 6A and 6B, specific diagnosis operation made by and measures taken by the diagnosis unit 106 will be explained.

In FIGS. 6A and 6B, in the step S601, the control unit 105 receives a current signal detected by the current transformer 405. The received current signal is an AC signal; thus, in the step S602, only positive signal components are extracted through a rectifier.

Next, in the step S603, the peak hold detector 406 extracts the P/H value of the signal rectified by the rectifier. Next, the step S603 is followed by the step S604, where it is determined whether or not the P/H value is smaller than a first threshold value 1. The determination result in the step S604 is "YES", i.e., in the case where the P/H value is smaller than the first threshold value 1, the step S604 is followed by the step S605, where it is determined whether or not the P/H value is smaller than a second threshold value 2.

In the case where the determination result in the step S605 is "YES", the step S605 is followed by the step S606, where it is determined that the energy supply unit 103 insufficiently supplies or does not supply electric energy to the ignition plug 101.

The fact that in the step S606, it is determined that the energy supply unit 103 insufficiently supplies or does not supply electric energy to the ignition plug 101 suggests that the energy instructed by the control unit 105 is not supplied to the ignition plug 101, and it is conceivable that there exists an abnormality in the energy supply unit 103; therefore, for safety's sake, shutdown processing such as stopping electric power supply to the energy supply unit 103 is implemented in the step S607. In other words, in response to an instruction from the control unit 105, the relay 409 connected between the battery 401 and the energy supply unit 103 is operated so that supply of electric power to the energy supply unit 103 is stopped.

After the shutdown processing in the step S607, a malfunction indicator lamp (referred to as MIL, hereinafter) is lit in the step S608 so as to notify the driver of an abnormality in the system; then, in the step S609, the processing of keep the EGR valve 104 closed until the combustion stabilizes.

Figure 7:
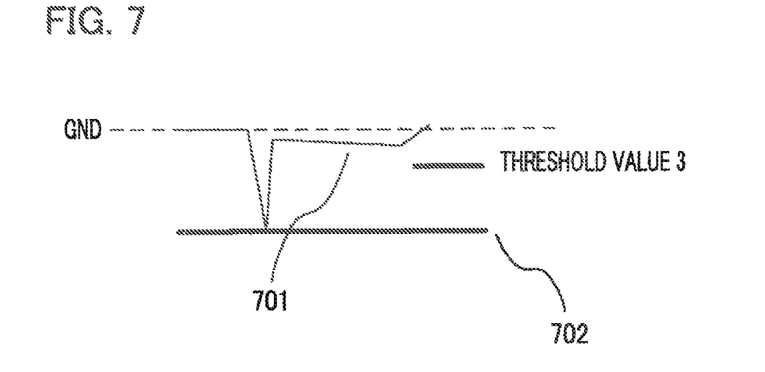
FIG. 7 is an explanatory chart representing the waveform of the primary voltage of an ignition coil in the internal combustion engine control apparatus according to Embodiment 1 of the present invention.

FIG. 7 is an explanatory chart representing the waveform of the primary voltage of the ignition coil in the internal combustion engine control apparatus according to Embodiment 1 of the present invention. In the case where in the foregoing step S605, it is determined that the P/H value is the same as or larger than the second threshold value 2 (NO), the step S605 is followed by the step S610, where the negative peak value (referred to as V1p, hereinafter) 702, represented in FIG. 7, of the primary voltage (referred to as V1, hereinafter) of the ignition coil 102 is extracted. V1p 702 is a value proportional to the value of a voltage for producing a spark discharge in the gap between the first electrode 101a and the second electrode 101b of the ignition plug 101. Accordingly, by checking the value of V1p 702, it can be determined whether or not the ignition coil 102 is desirably working.

That is to say, in the step S611, it is determined whether or not V1p, which is the negative peak level of V1 of the ignition coil 102, is larger (smaller, in terms of the absolute value thereof) than a predetermined third threshold value 3; in the case where the determination result is "YES", i.e., it is determined that the absolute value of V1p is smaller than the third threshold value 3, it is determined in the step S612 that the ignition coil 102 is not supplying desired electric energy to the ignition plug 101 and hence no spark discharge is produced, i.e., there exists some sort of abnormality in the ignition coil 102; then, the MIL is lit in the step S608, and the step S608 is followed by the step S609, where the EGR valve is closed.

In the case where the determination result in the step S611 is "NO", i.e., it is determined that the absolute value of V1p is larger than the third threshold value 3, the step S611 is followed by the step S613, where it is determined that although the ignition coil 102 desirably works, no spark discharge can be produced, i.e., there exists an abnormality, in the ignition plug 101, such as that the gap between the first electrode 101a and the second electrode 101b of the ignition plug 101 has expanded in such a way as to exceed the specified value; then, the MIL is lit in the step S608, and the step S608 is followed by the step S609, where the EGR valve is closed.

In contrast, in the case where it is determined in the step S604 that the P/H value is the same as or larger than the first threshold value 1 (NO), the step S604 is followed by the step S614, where it is determined whether or not the P/H value is smaller than a fourth threshold value 4. In the case where the P/H value is the same as or larger than the fourth threshold value 4, the energy supply unit 103 is outputting energy that is the same as or larger than the energy instructed by the control unit 105, and it is conceivable that the energy supply unit 103 is out of order. Thus, in the case where this state continues, a critical failure may occur in the energy supply unit 103; in addition, because excessive energy flows into the spark discharge path, the first electrode 101a, which is the central electrode of the ignition plug 101, and the second electrode 101b, which is the GND electrode thereof, may melt to be damaged or deteriorated.

Accordingly, in the case where it is determined in the step S614 that the P/H value is the same as or larger than the threshold value 4 (NO), the step S614 is followed by the step S615, where the control unit 105 determines that the energy supply unit 103 is out of order and hence excessive energy is being supplied to the ignition plug 101; then, the step 615 is followed by the step s607, where the energy supply unit 103 is shut down; then, the MIL is lit in the step S608, and the step S608 is followed by the step S609, where the EGR valve is closed.

In contrast, the determination result in the step S614 is "YES", i.e., in the case where the P/H value is between the first threshold value 1 and the fourth threshold value 4 and hence it is determined that the current of the level instructed by the control unit 105 is outputted, the integration value of the output of the current transformer 405 is obtained by the integrator 407 in the step S616.

Next, the step S616 is followed by the step S617, where it is determined whether or not the integration value of the output of the current transformer 405, which has been obtained in the step S616, is smaller than a fifth threshold value 5. When in the step S617, it is determined that the integration value of the output of the current transformer 405 is the same as or larger than the fifth threshold value 5 (NO), it can be determined that although a current of the desired level is being supplied to the spark discharge path, the supply period thereof has exceeded the period instructed by the control unit 105. In other words, in this case, it is conceivable that the energy supply unit 103 is outputting excessive energy and hence excessive energy is being supplied to the spark discharge path; thus, as described above, the energy supply unit 103 may cause a critical failure or may cause excessive deterioration in the first electrode 101a, which is the central electrode of the ignition plug 101, and the second electrode 101b, which is the GND electrode thereof.

Accordingly, when the determination result in the step S617 is "NO", the step S617 is followed by the step S615, where it is determined that energy is being excessively supplied; then, in the step S607, the energy supply unit 103 is shut down; then, the MIL is lit in the step S608, and the step S608 is followed by the step S609, where the EGR valve is closed.

In contrast, in the case where it is determined in the step S617 that the integration value of the output of the current transformer 405 is smaller than the fifth threshold value 5 (YES), the step S617 is followed by the step S618, where it is determined whether or not the integration value of the output of the current transformer 405 is smaller than a sixth threshold value 6. When in the step S618, it is determined that the integration value of the output of the current transformer 405 is smaller than the sixth threshold value 6 (YES), it is suggested that although a current of the level instructed by the control unit 105 is being applied to the spark discharge path, the apply period thereof is shorter than the period instructed by the control unit 105. In this case, as well, it is conceivable that the energy supply unit 103 is out of order. That is to say, when the determination result in the step S618 is "YES", it is determined that due to an abnormality in the energy supply unit 103, energy is insufficiently supplied; thus, in the step S607, the energy supply unit 103 is shut down; then, the MIL is lit in the step S608, and the step S608 is followed by the step S609, where the EGR valve is closed.

When the determination result in the step S618 is "NO", it is suggested that the integration value of the output of the current transformer 405 is between the fifth threshold value 5 and the sixth threshold value 6; thus, it can be determined that a current of the same level as that instructed by the control unit 105 is outputted in the same period as that instructed by the control unit 105, i.e., the whole system including the energy supply unit 103 are normal.

Even when the EGR valve 104 is opened so that the pumping loss in the internal combustion engine is reduced, stable combustion can be achieved in the case where the system works normally; therefore, in the step S620, the desired opening degree of the EGR valve 104 is maintained or the EGR valve 104 is opened up to its optimum state. In such a manner as described above, the flow of diagnosis by the diagnosis unit 106 is ended.

As far as the foregoing internal combustion engine control apparatus according to Embodiment 1 of the present invention is concerned, for the sake of clear understanding of the operation, the explanation has been made under the assumption that the control unit 105, the energy supply unit 103, and the ignition coil 102 are formed separately from one another; however, the energy supply unit 103 may be disposed inside the control unit 105, which is an ECU; alternatively, the energy supply unit 103 and the ignition coil 102 are integrated with each other and are disposed in a single and the same package.

The magnitude relationships among the first threshold value 1, the second threshold value 2, the fourth threshold value 4, and the P/H value are as represented in FIG. 5A. The magnitude relationships among the fifth threshold value 5, the sixth threshold value 6, and the integration value of the spark discharge reinforcement current are as represented in FIG. 5B. Moreover, the relationship between the V1p, which is the negative peak level of V1 of the ignition coil 102, and the third threshold value 3 is as represented in FIG. 7.

In addition, as far as the foregoing internal combustion engine control apparatus according to Embodiment 1 of the present invention is concerned, for the sake of clear understanding of the operation, the explanation has been made under the assumption that the relay 409 and the BPF 404 are formed separately from each other; however, a safety shutdown system such as the relay 409 may be disposed inside the energy supply unit 103, or BPF 404 may be disposed inside the energy supply unit 103. The ignition coil 102 and BPF 404 may be arranged in a single and the same package. Furthermore, it goes without saying that in the configuration represented in FIG. 4, the constituent elements to be arranged in a single and the same package can freely be determined in accordance with the situation.

In the internal combustion engine control apparatus according to Embodiment 1 of the present invention, as described above, the EGR valve is opened in order to reinforce a spark discharge, so that the pumping loss in the internal combustion engine is reduced and stable combustion can be achieved even in the case where the proportion of burned gas in the combustion chamber of the internal combustion engine increases; therefore, the fuel consumption amount of the internal combustion engine can be reduced; thus, the carbon dioxide footprint can largely be decreased and hence the internal combustion engine control apparatus according to Embodiment 1 of the present invention can contribute to the environment preservation. Moreover, it is diagnosed whether or not spark discharge is reinforced; in the case where spark discharge is not reinforced, the EGR valve is quickly closed, so that it is made possible to prevent unstable combustion from making non-combusted gas flow out or deteriorating exhaust gas; thus, the internal combustion engine control apparatus according to Embodiment 1 of the present invention can contribute to the environment preservation.

As another example, the internal combustion engine control apparatus according to Embodiment 1 of the present invention may be configured in such a way that the conductive path creation unit 102 is configured with a primary coil that is supplied with an electric current so as to generate magnetic flux and accumulate magnetic flux energy and a secondary coil that is magnetically coupled with the primary coil and releases the accumulated magnetic flux energy so as to generate a predetermined high voltage, that one terminal of the secondary coil is connected with a high voltage terminal for supplying the high voltage to the ignition plug 101, that the diagnosis unit 106 is provided with an energy detection unit that detects energy to be supplied by the energy supply unit 103 and a primary voltage detection unit that detects a primary voltage that is generated across the primary coil when the accumulated magnetic flux energy is released, and that the diagnosis unit 106 diagnoses at least one of the operation state of the energy supply unit 103, the operation state of the ignition plug, and the operation state of the ignition coil, based on the energy detected by the energy detection unit and the primary voltage detected by the primary voltage detection unit.

The internal combustion engine control apparatus according to Embodiment 1 of the present invention may be configured in such a way that the energy supply unit 103 is provided with a function stopping unit capable of stopping its own function and that in the case where the diagnosis unit 106 determines that the energy supply unit 103 does not normally supply energy to the conductive path formed in the gap of the ignition plug 101, the control unit 105 controls the function stopping unit so that the function of the energy supply unit 103 is stopped.

An internal combustion engine control apparatus according to the present invention is mounted in an automobile, a motorcycle, an outboard engine, an extra machine, or the like utilizing an internal combustion engine and is capable of safely raising the efficiency of the internal combustion engine; therefore, the internal combustion engine control apparatus according to the present invention contributes to solving fuel depletion problem and to preserving the environment.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus comprising:
    an ignition plug that is provided with a first electrode and a second electrode facing each other through a gap and produces a spark discharge in the gap so that an inflammable fuel-air mixture inside a combustion chamber of an internal combustion engine is ignited;
    an ignition coil that generates a high voltage and supplies the generated high voltage to the first electrode so as to produce the spark discharge in the gap and to form a conductive path in the gap;
    an energy supply that supplies energy to the conductive path based on the spark discharge formed in the gap;

a diagnosis processor that determines whether or not the energy supply is normally supplying the energy to the gap of the ignition plug based on a peak hold value of the energy and an integrated value of the energy;

an exhaust gas recirculation (EGR) valve that recirculates at least part of burned gas of the internal combustion engine to the combustion chamber; and a controller that controls the internal combustion engine, the energy supply, and the EGR valve, wherein in accordance with the result of a diagnosis by the diagnosis processor, the controller controls the EGR valve so that the amount of the burned gas to be recirculated is controlled.

2. The internal combustion engine control apparatus according to claim 1, wherein in the case where the diagnosis processor determines that the energy supply is not normally supplying energy to the conductive path, the controller controls the EGR valve in such a way as to decrease the amount of the burned gas to be recirculated in comparison with the amount thereof at a time when the energy supply is normally supplying energy to the conductive path.

3. The internal combustion engine control apparatus according to claim 1, wherein in the case where the diagnosis processor determines that the energy supply is normally supplying energy to the conductive path, the controller controls the EGR valve in such a way as to increase the amount of the burned gas to be recirculated in comparison with the amount thereof at a time when the energy supply is not normally supplying energy to the conductive path based on the spark discharge.

4. The internal combustion engine control apparatus according to claim 1, wherein the energy to be supplied from the energy supply to the conductive path is alternating current (AC) electric energy.

5. The internal combustion engine control apparatus according to claim 1,
wherein the energy supply includes a direct current (DC)/DC converter and a DC/alternating current (AC) converter that converts DC electric energy boosted by the DC/DC converter into AC electric energy, and
wherein the energy to be supplied from the energy supply to the conductive path is the AC electric energy outputted by the DC/AC converter.

6. The internal combustion engine control apparatus according to claim 1, wherein the diagnosis processor includes an energy detector for detecting energy to be supplied from the energy supply to the conductive path and determines an operation state of the energy supply, based on the energy detected by the energy detector.

7. The internal combustion engine control apparatus according to claim 1, wherein the diagnosis processor includes a peak hold detector for detecting the peak hold value of the energy and an integrator for integrating the energy to obtain the integration value, and
wherein the diagnosis processor determines an operation state of the energy supply, based on the peak hold value and the integration value.

8. The internal combustion engine control apparatus according to claim 1,
wherein the ignition coil includes a primary coil that is supplied with an electric current so as to generate magnetic flux and to accumulate magnetic flux energy and a secondary coil that is magnetically coupled with the primary coil and releases the accumulated magnetic flux energy so as to generate a predetermined high voltage,
wherein one terminal of the secondary coil is connected with a high voltage terminal for supplying the high voltage to the ignition plug,
wherein the diagnosis processor includes an energy detector that detects the energy to be supplied by the energy supply and a primary voltage detector that detects a primary voltage that is generated across the primary coil when the accumulated magnetic flux energy is released, and
wherein the diagnosis processor diagnoses at least one of an operation state of the energy supply, an operation state of the ignition plug, and an operation state of the ignition coil, based on the energy detected by the energy detector and the primary voltage detected by the primary voltage detector.

9. The internal combustion engine control apparatus according to claim 1, wherein the energy supply and the controller are arranged in a single and the same package.

10. The internal combustion engine control apparatus according to claim 1, wherein the energy supply and the ignition coil are arranged in a single and the same package.

11. The internal combustion engine control apparatus comprising:
an ignition plug that is provided with a first electrode and a second electrode facing each other through a gap and produces a spark discharge in the gap so that an inflammable fuel-air mixture inside a combustion chamber of an internal combustion engine is ignited;
an ignition coil that generates a high voltage and supplies the generated high voltage to die first electrode so as to produce the spark discharge in the gap and to form a conductive path in the gap;
an energy supply that supplies energy to the conductive path based on the spark discharge formed in the gap;
a diagnosis processor that determines whether or not the energy supply is normally supplying the energy to the gap of the ignition plug;
an exhaust gas recirculation (EGR) valve that recirculates at least part of burned gas of the internal combustion engine to the combustion chamber; and
a controller that controls the internal combustion engine the energy supply, and the EGR valve, wherein in accordance with the result of a diagnosis by the diagnosis processor, the controller controls the EGR valve so that the amount of the burned gas to be recirculated is controlled,
wherein the energy supply includes a function stopper capable of stopping its own function, and
wherein in the case where the diagnosis processor determines that the energy supply is not normally supplying the energy to the conductive path, the controller controls the function stopper so that the function of the energy supply is stopped.

* * * * *